United States Patent [19]

Daniels et al.

[11] 4,131,098
[45] Dec. 26, 1978

[54] ENGINE TIMING CONTROL CIRCUIT HAVING A SINGLE PICK-UP FOR BOTH STARTING AND RUNNING

[75] Inventors: Earl E. Daniels, Taylor; Frederick W. Crall, Farmington Hills, both of Mich.

[73] Assignee: Chrysler Corporation, Highland Park, Mich.

[21] Appl. No.: 752,492

[22] Filed: Dec. 20, 1976

[51] Int. Cl.² .............................................. F02P 5/04
[52] U.S. Cl. ............................ 123/117 R; 315/209 T
[58] Field of Search ....................... 123/117 R, 148 E; 315/209 T

[56] References Cited

U.S. PATENT DOCUMENTS

| | | | |
|---|---|---|---|
| 3,719,177 | 3/1973 | Oishi et al. | 123/148 E |
| 3,874,351 | 4/1975 | Asler et al. | 123/117 R |
| 3,885,534 | 5/1975 | Webster | 123/117 R |
| 3,910,243 | 10/1975 | Gau et al. | 123/117 R |
| 3,916,855 | 11/1975 | Fauser et al. | 123/117 R |
| 4,008,698 | 2/1977 | Gartner | 123/148 E |

*Primary Examiner*—Samuel Feinberg
*Attorney, Agent, or Firm*—Baldwin & Newtson

[57] ABSTRACT

A single pick-up coupled to sense engine crankshaft position can be utilized for both starting and running of the engine in an electronic spark timing advance control system. During starting, pulses from the pick-up are coupled via a zero crossing detector to the output ignition stage to cause spark plug firing at an essentially constant firing angle at or just slightly in advance of piston top dead center position. During running, the pulses from the pick-up reset, via a reset circuit, an integrator circuit so that a sawtooth waveform representative of engine crankshaft rotational position is developed. A desired timing signal derived from one or more parameters useful in controlling the time of ignition firing is compared against the sawtooth reference waveform and when a predetermined relationship between the two is attained, the ignition is fired. Should this predetermined relationship not be attained during a cycle of the sawtooth, the reset signal from the reset circuit forces ignition firing. A frequency sensitive switch circuit senses approximate engine speed to selectively control ignition firing via the zero crossing detector during starting and via the desired timing signal during running. A safety feature permits the ignition to continue to fire from the zero crossing detector in the event that firing by the desired timing signal is impaired.

23 Claims, 6 Drawing Figures

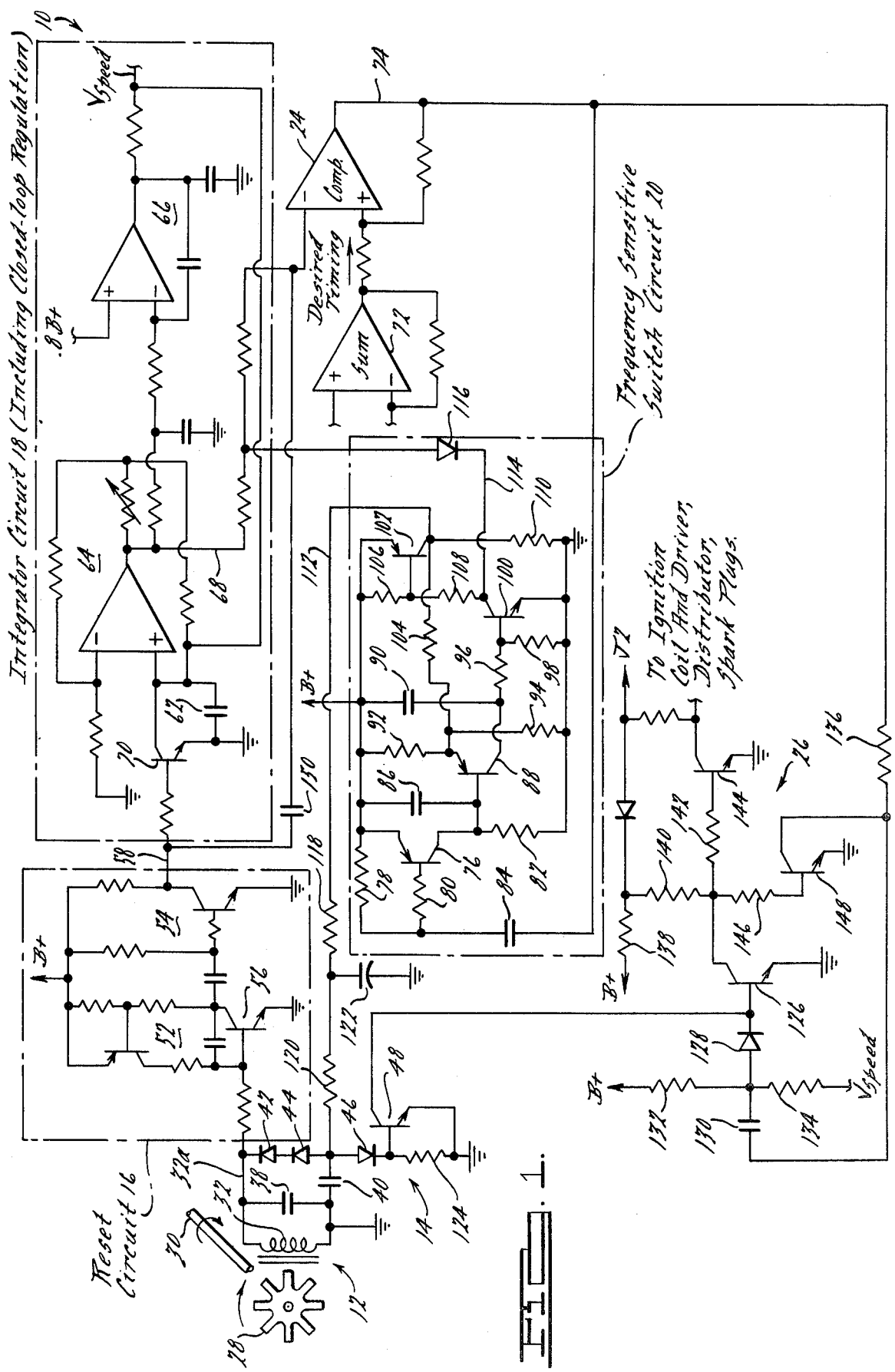

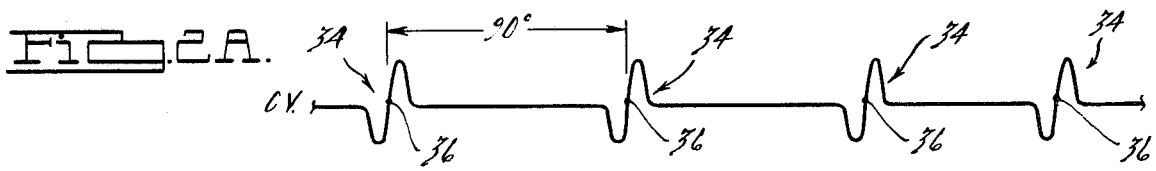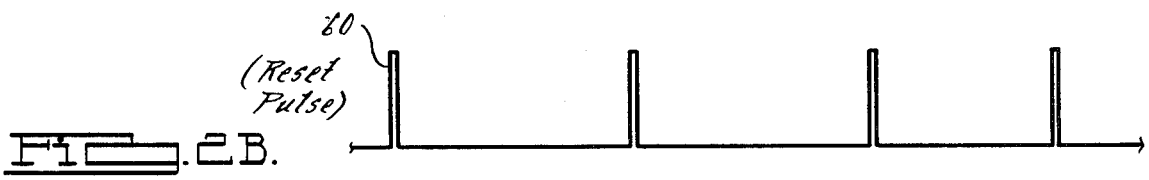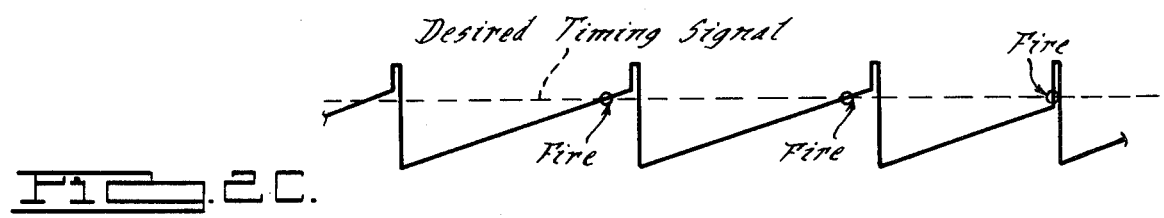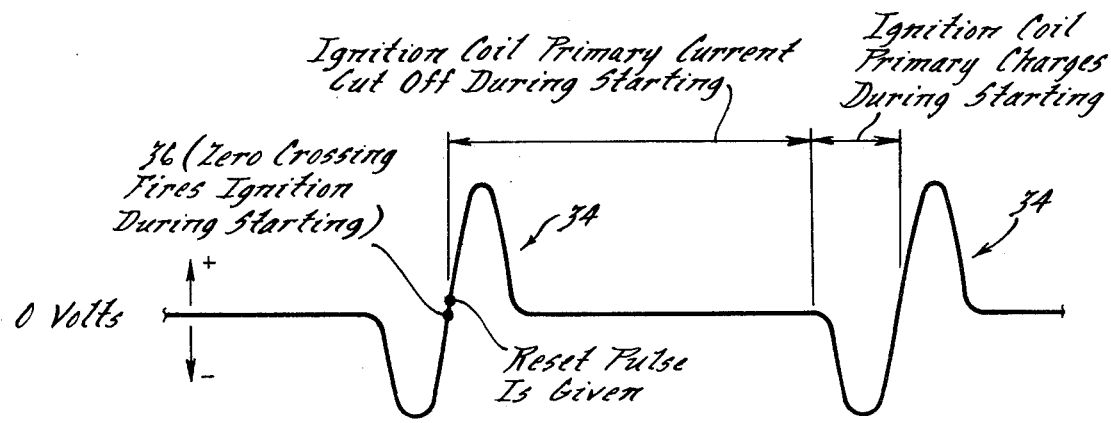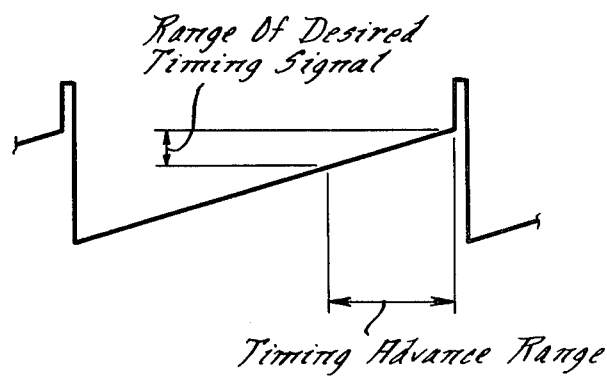

ENGINE TIMING CONTROL CIRCUIT HAVING A SINGLE PICK-UP FOR BOTH STARTING AND RUNNING

BACKGROUND AND SUMMARY OF THE INVENTION

This invention pertains to electronic engine controls and particularly to a novel electronic timing control circuit which utilizes a single pick-up for both starting and running.

One known type of electronic spark timing advance control system is disclosed in U.S. Pat. No. 3,910,243 assigned to the same assignee as the present application. In that system, separate start and run pick-ups are used to control the ignition firing under starting and running conditions, respectively. Another type of system is disclosed in the pending U.S. application, Ser. No. 588,278, filed June 19, 1975, assigned to the same assignee as the present application.

The present invention is concerned with eliminating one of the pick-ups from a dual pick-up type system but without impairing the capability of the system to perform satisfactorily during starting and running. Attempts to eliminate one of the pick-ups from a dual pick-up system have given rise to several potential obstacles. One apparent obstacle was that with a single pick-up, the pick-up signal is given in fixed relation to the engine piston position unless provision is made for mounting the pick-up so that it may be adjusted relative to crankshaft position. Another obstacle was that battery voltage experiences a large drop due to starter motor current draw which becomes even larger under extreme cold weather conditions. Moreover, the starter motor itself generates a large amount of electrical noise which greatly reduces the signal-to-noise ratio for the pick-up signal which is already a relatively low magnitude signal because of the lower velocity during engine cranking. Where the pick-up signal is utilized in an electronic timing advance circuit to reset an integrator for the purpose of generating a reference waveform representative of instantaneous crankshaft position, the pick-up must be positioned in fixed relationship to the piston position; yet, because the pick-up is also utilized for starting, its position must be such that ignition firing during starting can be accomplished at or only slightly in advance of piston top dead center position. In order to fulfill both requirements for starting and for generating the sawtooth signal during running, the ignition firing range, during running, is in the vicinity of the peak of the sawtooth; and this means that the ignition may not fire under certain transient conditions because of inherent time constants in the system.

The present invention has overcome the foregoing obstacles and provides a single pick-up electronic spark timing control system with capabilities for both starting and running. Moreover, the invention includes one feature which prevents misfiring during transient conditions which occur during running and another feature which enables ignition firing to continue despite certain impairment of normal firing during running.

The foregoing features, advantages, and benefits of the invention, along with additional ones, will be seen in the ensuing description and claims which are to be considered in conjunction with the accompanying drawings. The drawings disclose a preferred embodiment of the invention according to the best mode presently contemplated in carrying out the invention.

BRIEF DESCRIPTION OF THE DRAWINGS

FIG. 1 is an electrical schematic circuit diagram of an engine timing control system embodying principles of the present invention.

FIGS. 2A, 2B, and 2C are waveforms (not necessarily to scale) at selected points of the circuit of FIG. 1 for the purpose of better illustrating the circuit operation.

FIG. 3 is an explanatory waveform illustrating a portion of FIG. 2A on a larger scale.

FIG. 4 is an explanatory waveform illustrating a portion of FIG. 2C on a larger scale.

DESCRIPTION OF THE PREFERRED EMBODIMENT

In FIG. 1 an electronic engine timing control circuit 10 embodying principles of the present invention comprises a transducer 12, a zero crossing detector circuit 14, a reset circuit 16, an integrator circuit 18, a frequency sensitive switch circuit 20, a comparator circuit 24, and an ignition stage 26. The circuit is energized from the B+ supply voltage which is a regulated voltage derived from the battery in conventional fashion. Transducer 12 includes a reluctor wheel 28 coupled to rotate in unison with the engine crankshaft 30. A single pick-up coil 32 is inductively coupled with reluctor wheel 28 to generate at line 32a a voltage waveform such as that shown in FIG. 2A. Looking to FIG. 2A, the signal is seen to comprise a series of bi-polar pulses 34 which are given at predetermined engine crank angles. For example, the eight toothed wheel 28 shown in FIG. 1 can be utilized in an eight cylinder engine to provide 90° crankshaft rotation between successive bi-polar pulses. Each bi-polar pulse 34 comprises a leading negative-going portion followed by a positive-going portion. As will be explained in greater detail later, the zero voltage crossing 36 of each pulse 34 is utilized in conjunction with zero crossing detector circuit 14 to provide ignition firing during starting. It will be appreciated that as the engine speed changes, both the frequency and amplitude of the pulses will similarly change. A pair of filter capacitors 38 and 40 are connected in circuit as illustrated to reduce noise on the lines.

The zero crossing detector circuit 14 includes a pair of diodes 42 and 44 connected across coil 32 as illustrated and a diode 46 and a transistor 48 connected as illustrated. The four circuit elements 42, 44, 46, 48 are selected so that the two diodes 42, 44 exhibit a forward conduction characteristic between the anode of diode 44 and the cathode of diode 42 which matches the forward conduction characteristic between the anode of diode 46 and the emitter of transistor 48. The emitter of transistor 48 is referenced to ground, and the cathode of diode 42, to the output of coil 32 at line 32a. The anodes of diodes 44, 46 have a common junction.

Diodes 42, 44 are poled to permit the positive-going portions of pulses 34 to be applied as inputs to reset circuit 16. Reset circuit 16 is of the type shown in U.S. Pat. No. 3,991,730 assigned to the same assignee as the present application. Briefly, reset circuit 16 includes a bi-stable input stage 52 and a monostable output stage 54. When the positive-going pulse portion rises sufficiently high to forward bias transistor 56 of bi-stable circuit 52, monostable 54 is triggered to produce a short-duration positive output pulse at line 58. The waveform at line 58 is illustrated in FIG. 2B with each pulse being identified by the reference numeral 60.

Each pulse 60 is coupled via line 58 to integrator circuit 18 and causes the integrator to be reset. The integrator circuit is like that shown in pending U.S. application, Ser. No. 545,274, filed Jan. 30, 1975 and assigned to the same assignee as the present application. Integrator circuit 18 includes an integrating capacitor 62 connected to the non-inverting input of an amplifier stage 64 which generates a ramp output signal. The base of a reset transistor 70 connects to line 58 and the collector-emitter circuit thereof shunts capacitor 62. The resetting of the integrator is accomplished by transistor 70 conducting during the duration of each pulse 60 to discharge accumulated charge on capacitor 62. The circuit is closed-loop regulated by a feedback circuit 66 which adjusts the charging rate of capacitor 62 so that the peak amplitude which the ramp attains is regulated to a predetermined magnitude which is independent of the frequency at which the integrator is reset. In this way integrator circuit develops an output waveform at line 68 which takes the form of a sawtooth waveform whose instantaneous magnitude is representative of the instantaneous engine crankshaft angular position.

The reference sawtooth waveform developed by integrator circuit 18 is supplied to the inverting input of comparator 24. A desired timing signal representing desired timing of ignition firing during running of the engine is supplied to the non-inverting input of comparator 24. The desired timing signal is derived in conventional fashion from one or more parameters useful in controlling ignition firing such as manifold vacuum, engine speed, etc., these signals being algebraically summed at a summing amplifier 72. Comparator 24 compares the desired timing signal with the reference sawtooth waveform and when the desired timing signal intercepts the sawtooth, the comparator provides an output ignition firing signal via line 74 to ignition stage 26. Because the desired timing signal will vary in accordance with the selected input parameters which are utilized to develop it, the crankshaft angle at which comparator 24 will fire the ignition is similarly varied. This represents the normal manner of ignition firing during normal running of the engine. In the present embodiment the ignition firing signal from comparator 24 is in the form of a sharp transistion from approximately the positive supply voltage to approximately ground voltage.

During starting of the engine, however, ignition firing is accomplished from pick-up coil 32 via the zero crossing detector circuit 14. In order to selectively control ignition firing from comparator 24 during normal running and from zero crossing detector 14 during starting, it is necessary to distinguish between starting and running. One way of accomplishing this is to sense engine speed, and one way of sensing engine speed, at least approximately, is by monitoring the frequency of occurrence of ignition firing signals from comparator 24. In the preferred embodiment frequency sensitive switch circuit 20 connects to line 74 to monitor these ignition firing signals. Briefly, when the frequency of the ignition firing signals produced by comparator 24 is below a certain frequency corresponding to a certain engine speed, then pulses from pick-up coil 32 are coupled via zero crossing detector 14 to ignition stage 26 to cause the ignition to fire; when the frequency of the signals from comparator 24 exceeds this certain frequency, then the ignition firing signals from comparator 24 cause the ignition stage 26 to fire the ignition. As will be explained in greater detail hereinafter, comparator 24 will, under normal operation, always produce one ignition firing signal per each pick-up pulse 34 over a range of engine speeds sufficient to provide proper selectivity regardless of whether the ignition firing signal from the comparator, or the zero crossing signal from zero crossing detector 14, actually fires the ignition.

Frequency sensitive switch circuit 20 comprises an input transistor circuit including a transistor 76, three resistors 78, 80 and 82, and a pair of capacitors 84 and 86 which are connected as illustrated. In the absence of ignition firing signals at line 74, this input circuit assumes a condition where capacitor 86 is charged to approximately the full B+ supply voltage and transistor 76 is non-conducting. A second stage of frequency sensitive switch circuit 20 is coupled to the first stage and includes a transistor 88, a capacitor 90, and resistors 92, 94, 96, and 98 connected as shown. With the first stage in the condition described above wherein transistor 76 is not conducting and capacitor 86 is charged to essentially the full supply voltage, transistor 88 assumes a conductive condition. In this conductive condition capacitor 90 is charged to a certain voltage which is a function of the resistance values. Frequency sensitive switch circuit 20 has an output stage coupled to the second stage which includes two transistors 100, 102, and four resistors 104, 106, 108, and 110 connected as illustrated. With the first and second stages of circuit 20 in the above described conditions, both transistors 100 and 102 are in conduction. Under this condition frequency sensitive switch circuit 20 produces an output voltage signal on line 112 (i.e. at the collector of transistor 102) of a positive magnitude approximating the B+ supply voltage; and on line 114 (i.e. at the collector of transistor 102) a signal just above ground potential. The signal on line 112 is supplied via a ripple filter (hereinafter described) to zero crossing detector circuit 14 and the signal on line 114 via a diode 116 to the junction of two series resistors which connect the output 68 of integrator 18 to the inverting input of comparator 24. The effects of these signals will be explained later. As will be more fully understood from ensuing description, this condition of these two signals corresponds to a lower range of engine speeds within which ignition firing is by the zero crossing detector from the zero crossings of pulses 34. When the engine speed increases beyond this lower range, then circuit 20 assumes a condition where the signal at line 112 drops to approximately ground potential and the signal at line 114 rises to a positive potential significantly above ground potential.

In order to explain the operation of the frequency sensitive switch circuit 20, let it be assumed that ignition firing signals are being produced by comparator 24 at a frequency corresponding to an engine speed within this lower speed range. Each signal is coupled through capacitor 84 to switch transistor 76 into conduction for a very brief instant of time. During this instant, conduction of transistor 76 discharges capacitor 86 to raise the voltage potential at the base of transistor 88 to a point where transistor 88 is rendered non-conducting. When conduction of transistor 76 terminates, the potential at the base of transistor 88 begins to transiently approach ground potential as capacitor 86 recharges. The charging characteristic of capacitor 86 is determined by the time constant defined by itself and resistor 82. Although transistor 88 cuts off in response to discharge of capacitor 86 by transistor 76, the charge on capacitor 90 holds transistor 100 in conduction at least momentarily. When transistor 88 was cut off, the voltage at the base of transistor 100 began to decay toward ground potential along an exponential transient defined by the RC time constant of capacitor 90 and the sum of resistors 96 and 98. Should transistor 88 remain cut off for a time long enough to permit the voltage at the base of transistor 100 to decay to a point where transistor 100 no longer remains conducting, then both transistor 100 and transistor 102 switch into non-conducting conditions to change the signal levels at lines 112 and 114. So long as the frequency of the ignition signals is within the lower speed range, transistor 88 does not remain cut off for a time long enough to permit transistors 100 and 102 to become nonconducting. Thus, it will be appreciated that the RC time constant defined by resistor 82 and capacitor 86 is smaller than the RC time constant defined by capacitor 90 and the sum of resistors 96 and 98.

Now if it is assumed that the frequency of the ignition firing signals from comparator 24 increases beyond the lower range, a point is reached where capacitor 86 is being so frequently discharged by transistor 76 that the potential at the base of transistor 100 falls below the level required to maintain transistors 100 and 102 conducting so that the potential at line 114 rises and the potential at line 112 falls. Resistor 104 provides a certain hysteresis in the switching characteristic of frequency sensitive switch circuit 20 whereby the frequency of ignition signals required to switch the circuit from the lower speed range condition to the upper speed range condition is somewhat greater than that required to switch from the upper speed range condition back to the lower speed range condition. Resistor 104 provides that when transistor 102 is conducting, a somewhat more positive potential exists at the emitter of transistor 88 than when transistor 102 is not conducting. When the potential at the emitter of transistor 88 is more positive, capacitor 86 must be discharged slightly more frequently in order to switch from the lower speed range condition to the upper speed range condition. In the preferred embodiment the circuit parameters are selected using standard selection techniques to provide for switching from the lower speed range to the upper speed range at a frequency corresponding to a speed slightly greater than engine cranking speed and for switching back at a frequency corresponding to a speed less than engine idle speed. In a V-8 engine these might be 750 r.p.m. and 300 r.p.m., respectively. As will be seen later, this preferred selection of switching frequencies provides a safety feature.

It can now be explained that when frequency sensitive switch circuit 20 is in the lower speed range condition, the positive signal at line 112 is utilized to activate zero crossing detector circuit 14 and the ground signal at line 114 prevents the sawtooth reference signal waveform from being supplied from integrator circuit 18 to comparator 24. Because the sawtooth is of positive polarity, the coupling of the ground signal at line 114 through diode 116 grounds out the sawtooth waveform. When the frequency sensitive switch circuit is in the upper speed range condition, the potential at line 114 is sufficiently positive that diode 116 is reversed biased so that the transmission of the sawtooth waveform to comparator 24 is unimpaired.

Line 112 is connected with the zero crossing detector via a ripple filter comprising two resistors 118, 120 and a capacitor 122 connected as illustrated. This ripple filter serves to reduce noise spikes which appear on the positive supply line, particularly those caused by starter motor operation. Moreover, charge on capacitor 122 serves to augment current flow to the zero crossing detector which is beneficial under conditions where supply voltage during cranking is quite low. The output of the zero crossing detector circuit is taken at the collector of transistor 48. When the signal at line 112 is low (upper speed range condition), transistor 48 remains non-conductive. However, when the signal at line 112 goes high, the zero crossing detector will trigger ignition stage 26. This happens in the following fashion. During the leading negative polarity portion of each bi-polar pulse 34, diodes 42 and 44 are forward biased into conduction and the potential at the common anodes of diodes 44 and 46 is insufficient to forward bias diode 46 and transistor 48. However, when the pulse passes through the zero volts level from negative to positive, diodes 42 and 44 are no longer forward biased. Now, energizing current can flow from line 112 through the ripple filter to make diode 46 and the base emitter of transistor 48 forward biased. Accordingly, the collector of transistor 48 is pulled down toward ground. This causes ignition stage 26 to fire the ignition. A resistor 124 is preferably connected across the base-emitter of transistor 48 as shown to provide a degree of noise immunity. The collector of transistor 48 remains pulled down until the leading negative polarity portion of the succeeding pulse 34.

Ignition circuit 26 includes an anti-dwell timing circuit comprising a transistor 126, a diode 128, a capacitor 130, and resistors 132, 134, 138 and 140. These are connected in circuit as illustrated. The output of comparator 24 is coupled via a resistor 136 and through capacitor 130 and diode 128 to the base of transistor 126. The collector of transistor 48 is coupled directly into the base of transistor 126. The $V_{speed}$ signal obtained from the closed-loop regulation of circuit 18 and representing engine speed is coupled through resistor 134 to the anode of diode 128 and the full B+ potential is coupled through resistor 132 also to the anode of diode 128. Assuming that no ignition firing signals are being received from either comparator 24 or from zero crossing detector circuit 14, then transistor 126 is biased for conduction from the B+ supply through resistor 132 and diode 128. Under this condition the voltage at the collector of transistor 126 is only slightly above ground potential. The collector of transistor 126 is coupled through resistor 142 to the base of a subsequent transistor 144 so that transistor 144 is non-conducting when transistor 126 is conducting, and vice versa. A lock-out circuit including a resistor 146 and a transistor 148 is connected in circuit as illustrated. With transistor 126 conducting, transistor 148 is non-conducting, and vice versa.

Let it be assumed that only ignition signals from comparator 24 are being supplied to ignition stage 26. Each signal is coupled through resistor 136, capacitor 130, and diode 128 to the base of transistor 126 thereby cutting off this transistor. In response, both transistors 144 and 148 are switched into conduction. The switching of transistor 144 into conduction fires the ignition driver and coil so that a spark is delivered via the distributor to the appropriate spark plug. These latter components are conventional items which are not illustrated in detail in the drawing. When transistor 148 switches into conduction, the potential at the junction of capacitor 130 and resistor 136 is pulled down to slightly above ground potential. Because of this lock-out feature, the subsequent switching of the comparator output signal at line 74 back to a more positive level has no influence on the timing of the transient which is executed by the anti-dwell monostable stage. The duration for which transistor 126 conducts is determined by the particular component values selected for capacitor 130 and resistors 132 and 134 as well as the magnitude of the $V_{speed}$ signal. In this way a variable anti-dwell feature is provided which is related to engine speed. Once the monostable anti-dwell timing transient has been executed, transistor 126 returns to conduction thereby switching transistors 144 and 148 back to their non-conducting conditions. This represents one complete firing cycle of the ignition stage during running of the engine.

Now let it be assumed that only signals from zero crossing detector 14 are being supplied to stage 26. Each time that transistor 48 conducts, transistor 126 is switched into non-conduction to fire the ignition. However, because the coupling is directly into the base of transistor 126, no anti-dwell timing cycle is executed. Thus, in this mode of operation, the ignition is fired in response to the zero crossing 36 of each bi-polar pulse 34. As depicted in FIG. 3, the ignition coil is recharged only during the leading negative polarity portion of each pulse 34 because transistor 48 remains conducting until the pick-up voltage goes negative. Because of the low cranking speed at starting, this provides ample time to recharge the ignition coil, yet conserves the battery since no current is drawing between pulses.

In order to provide for starting of the engine, the ignition timing at starting is typically at or just slightly in advance of piston top dead center position. Thus, pick-up coil 32 must be physically disposed in relation to reluctor wheel 28 such that each zero crossing 36 of each bi-polar pulse 34 occurs at such position. Because each bi-polar pulse is also utilized to reset integrator circuit 18, it will be appreciated that the peak amplitude of the reference sawtooth waveform is also going to be located at or near piston top dead center position. Because the timing is advanced during running of the engine within a range immediately in advance of top dead center position, the desired timing signal will intercept the reference sawtooth waveform in the vicinity of its peak. This is shown graphically in FIG. 4. When firing of the ignition is within a range such as that shown in FIG. 4, transient conditions and noise can present problems whereby misfiring can occur. Particularly, it is possible for the ignition to skip under certain noise or transient conditions. Therefore, in order to preclude the possibility of such skipping, reset circuit 16 is directly coupled to the inverting input of comparator 24 via a capacitor 150 to cause each reset signal 60 to be super-imposed upon the sawtooth at each peak of the sawtooth. By regulating the sawtooth peak to a regulated potential which is somewhat below that of the reset pulse signal and by controlling the range of the desired timing signal, an ignition signal will be given at line 74 in response to a reset pulse 60 should the comparator for any reason not have previously given an ignition firing signal for the cycle of the sawtooth on which it is being superimposed. By coupling the reset pulses to comparator 24, it is possible to utilize the pulses from comparator 24 as an approximate engine speed signal which may be monitored by frequency sensitive switch circuit 20 since the comparator will always produce one ignition signal per each pulse 36, although the timing is subject to variation within the range of timing. (It should be recognized that during cranking there is the possibility of poor quality in the firing signals from comparator 24 or even loss thereof because of noise, low battery voltage, and/or low pulse voltage. However, it will be remembered that in the absence of signals to frequency sensitive switch circuit 20, the latter energizes zero crossing detector to provide for ignition firing from the zero crossings 36 of pulses 34.) A further advantage is obtained by having frequency sensitive switch circuit 20 sense engine speed by monitoring the ignition signals from comparator 24. Should there be a failure in reset circuit 16, integrator circuit 18, or comparator 24, or any of the circuits which are utilized to develop the desired timing signal, resulting in loss of ignition firing signals at line 74, then the ignition can still be fired via the zero crossing detector. This means that the engine can still be operated even though it will probably be apparent that optimum engine performance is not being obtained because ignition timing is at the constant firing angle at or just slightly in advance of top dead center.

While the present invention has been disclosed in connection with a preferred embodiment thereof, it should be appreciated that the principles are applicable to other specific circuit configurations and, therefore, that the scope of the invention is to be limited only by the following claims.

What is claimed is:

1. In an internal combustion engine, an electronic engine timing control circuit comprising:
    transducer means operatively coupled with the engine for producing pulses which exhibit a zero voltage crossing at predetermined engine crank angles;
    an output circuit which is triggered to produce an engine control signal;
    an integrator circuit providing an output signal;
    reset circuit means coupling said transducer means and said integrator circuit for resetting the latter from said pulses;
    means providing a desired timing signal derived from at least one parameter useful in determining the timing of said engine control signal;
    comparator circuit means for comparing the integrator output signal with the desired timing signal and producing an output trigger signal when a predetermined relationship between the two is attained;
    means coupling said comparator circuit means to said output circuit so that an output trigger signal from said comparator circuit means can cause said output circuit to be triggered;
    a zero crossing detector coupling said transducer means and said output circuit so that zero crossing of said pulses can cause said output circuit to be triggered;
    and means for selectively controlling triggering of said output circuit from said zero crossing detector and said comparator circuit means comprising frequency sensitive switch means for sensing the frequency of a signal representative of engine speed and providing one switch condition when the sensed engine speed is less than a given speed and another switch condition when the sensed engine speed exceeds said given speed, means coupling said frequency sensitive switch means and said zero crossing detector for causing zero crossings of said pulses to trigger said output circuit when said frequency sensitive switch means is in its one switch condition, means coupling said frequency sensitive switch means and said comparator circuit means for causing said comparator circuit means to trigger said output circuit when said frequency sensitive switch means is in its another switch condition;

wherein said transducer means comprises an inductance coil; and wherein said zero crossing detector comprises first and second diode means, said two diode means having a common junction, said first diode means being connected across said inductance coil, said second diode means including the base-emitter junction of a transistor, said transistor being switched from one conductivity condition to another conductivity condition by the zero crossing of said pulses when said frequency sensitive switch means is in its one switch condition.

2. An electronic engine timing control circuit as set forth in claim 1 including a ripple filter circuit having a storage capacitor which operatively couples said frequency sensitive switch means and said zero crossing detector.

3. In an internal combustion engine, an engine timing control circuit comprising:

transducer means operatively coupled with the engine for producing pulses which exhibit a zero voltage crossing at predetermined engine crank angles;

an output circuit which is triggered to produce an engine control signal;

an integrator circuit providing an output signal;

reset circuit means coupling said transducer means and said integrator circuit for resetting the latter from said pulses;

means providing a desired timing signal derived from at least one parameter useful in determining the timing of said engine control signal;

comparator circuit means for comparing the integrator output signal with the desired timing signal and producing an output trigger signal when a predetermined relationship between the two is attained;

means coupling said comparator circuit means to said output circuit so that an output trigger signal from said comparator circuit means can cause said output circuit to be triggered;

a zero crossing detector coupling said transducer means and said output circuit so that zero crossing of said pulses can cause said output circuit to be triggered;

and means for selectively controlling triggering of said output circuit from said zero crossing detector and said comparator circuit means comprising frequency sensitive switch means for sensing the frequency of a signal representative of engine speed and providing one switch condition when the sensed engine speed is less than a given speed and another switch condition when the sensed engine speed exceeds said given speed, means coupling said frequency sensitive switch means and said zero crossing detector for causing zero crossings of said pulses to trigger said output circuit when said frequency sensitive switch means is in its one switch condition, means coupling said frequency sensitive switch means and said comparator circuit means causing said comparator circuit means to trigger said output circuit when said frequency sensitive switch means is in its another switch condition; and including means for forcing said comparator circuit means to produce said output trigger signal upon resetting of said integrator circuit should said comparator circuit means have failed to give said output trigger signal in the interval between the present and preceding resettings of said integrator circuit.

4. An electronic engine timing control circuit as set forth in claim 3 wherein said comparator circuit means is forced to produce said output trigger signal by a coupling circuit means coupling a reset pulse from said reset circuit means to said comparator circuit means.

5. An electronic engine timing control circuit as set forth in claim 3 including means coupling said comparator circuit means with said frequency sensitive switch means so that the output trigger signal of said comparator circuit means is supplied to said frequency sensitive switch means, said frequency sensitive switch means comprising means for causing itself to assume its one switch condition when the frequency of said output trigger signal is below a frequency corresponding to said given speed and for causing itself to assume its another switch condition when the frequency of said output trigger signal is above said frequency corresponding to said given speed.

6. In an internal combustion engine, an electronic engine timing control circuit comprising:

means providing a desired timing signal derived from at least one parameter useful in determining the timing of an event associated with operation of the engine;

means providing a reference sawtooth waveform representative of engine crankshaft rotational position;

means comparing said desired timing signal and said reference sawtooth waveform to produce an output signal at the desired time of occurrence of said event; and means superimposing a forcing signal on said sawtooth waveform at the peak of each cycle thereof which, should said comparing means have failed to produce said output signal during that cycle of said sawtooth waveform on whose peak said forcing signal is being superimposed, forces said comparing means to produce said output signal.

7. An electronic engine timing control circuit as set forth in claim 6 wherein said forcing signal is in the form of a rectangular pulse.

8. An electronic engine timing control circuit as set forth in claim 6 wherein said output signal is in the form of a sharp edge transition between two signal levels.

9. In an internal combustion engine, an electronic engine timing control circuit comprising:

an integrator circuit;

reset circuit means for providing reset signals at predetermined engine crank angles to reset the integrator circuit and thereby develop a sawtooth waveform;

means providing a desired timing signal derived from at least one parameter useful in determining the timing of an event associated with the operation of the engine;

means comparing said desired timing signal and said sawtooth waveform to produce an output signal at the desired time of occurrence of said event;

and means coupling said reset circuit means and said comparing means for forcing said comparing means to produce said output signal in response to an occurrence of a reset signal should said comparing means have failed to produce said output signal during the interval between the present reset signal and the immediately preceding reset signal.

10. An electronic engine timing control circuit as set forth in claim 9 wherein the reset signal is superimposed on the sawtooth waveform at the peak of each cycle thereof.

11. An electronic engine timing control circuit as set forth in claim 9 including utilization circuit means which is actuated by each occurrence of said output signal, transducer means coupling the engine crankshaft and said reset circuit means for producing transducer signals at said predetermined engine crank angles so as to cause said reset circuit means to provide said reset signals, means for sensing occurrence of said output signal of said comparing means, and means for actuating said utilization circuit means from said transducer signals, instead of from occurrences of said output signal, in the event of loss of said output signal.

12. In an internal combustion engine, an electronic engine timing control circuit comprising:
transducer means operatively coupled with the engine for producing pulses which exhibit a zero voltage crossing at predetermined engine crank angles;
an output circuit which is triggered to produce an engine control signal;
a run circuit coupling said transducer means and said output circuit for triggering said output circuit when the engine speed is above a given speed, said run circuit comprising:
an integrator circuit providing an output signal,
reset circuit means coupling said transducer means and said integrator circuit for resetting the latter from said pulses,
means providing a desired timing signal derived from at least one parameter useful in determining the timing of said engine control signal,
comparator circuit means for comparing the integrator output signal with the desired timing signal and producing an output trigger signal when a predetermined relationship between the two is attained,
means coupling said comparator circuit means to said output circuit so that an output trigger signal from said comparator circuit means can cause said output circuit to be triggered;
a start circuit coupling said transducer means and said output circuit for triggering said output circuit when the engine speed is below said given speed, said start circuit comprising:
a zero crossing detector coupling said transducer means and said output circuit so that zero crossings of said pulses can cause said output circuit to be triggered;
switch means responsive to engine speed which provides one switch condition when engine speed is less than said given speed and other switch condition when engine speed is above said given speed;
means operatively coupling said switch means with both said run circuit and said start circuit; and
wherein said switch means comprises means effective to activate said zero crossing detector when said switch means is in its one switch condition and to de-activate same when in its another switch condition whereby zero crossing of said pulses will cause triggering of said output circuit only when said switch means is in its one switch condition, and means effective to interrupt transmission of said integrator output signal to said comparator circuit means when said switch means is in its one switch condition and to permit transmission when in its another switch condition whereby said output trigger signal will trigger said output circuit only when said switch means is in its another switch condition.

13. An electronic engine timing control circuit as set forth in claim 12 including means for forcing said comparator circuit means to produce said output trigger signal upon resetting of said integrator circuit should said comparator circuit means have failed to give said output trigger signal in the interval between the present and preceding resettings of said integrator circuit.

14. An electronic engine timing control circuit as set forth in claim 13 wherein said comparator circuit means is forced to produce said output trigger signal by a coupling circuit means coupling a reset pulse from said reset circuit means to said comparator circuit means.

15. An electronic engine timing control circuit as set forth in claim 13 including means coupling said comparator circuit means with said switch means so that the output trigger signal of said comparator circuit means is supplied to said switch means, said switch means further comprising means for causing itself to assume its one switch condition when the frequency of said output trigger signal is below a frequency corresponding to said given speed and for causing itself to assume its another switch condition when the frequency of said output trigger signal is above said frequency corresponding to said given speed.

16. An electronic engine timing control circuit as set forth in claim 12 wherein said transducer means comprises means for producing said pulses each with a leading portion of one polarity and a trailing portion of opposite polarity, said zero crossing being given at the transition from the leading portion to the trailing portion.

17. An electronic engine timing control circuit as set forth in claim 12 wherein said output circuit produces said engine control signal as an engine spark timing signal, said electronic engine timing control circuit further including anti-dwell control means for providing a variable anti-dwell timing characteristic between occurrences of said engine control signal as a function of engine speed, but only when said comparator circuit means is causing the occurrence of said engine control signal.

18. An electronic engine timing control circuit as set forth in claim 12 wherein said reset circuit means produces a short duration rectangular pulse to reset said integrator circuit.

19. An electronic engine timing control circuit as set forth in claim 12 wherein said comparator circuit means comprises means for producing said output trigger signal as a sharp edge voltage transition.

20. An electronic engine timing control circuit as set forth in claim 12 wherein said transducer means comprises an inductance coil.

21. An electronic engine timing control circuit as set forth in claim 12 including means providing for hysteresis in the switching characteristic of said switch means.

22. An electronic engine timing control circuit as set forth in claim 12 wherein said output circuit comprises the ignition stage of an electronic spark timing control system.

23. An electronic engine timing control circuit as set forth in claim 12 wherein said frequency sensitive switch means comprises two output terminals, one of which is coupled with said comparator circuit means and the other of which is coupled with said zero crossing detector.

* * * * *